Sept. 29, 1931.  F. ZORN  1,825,499
NONSLIPPING STOPPER FOR SINKS AND THE LIKE
Filed Nov. 2, 1929
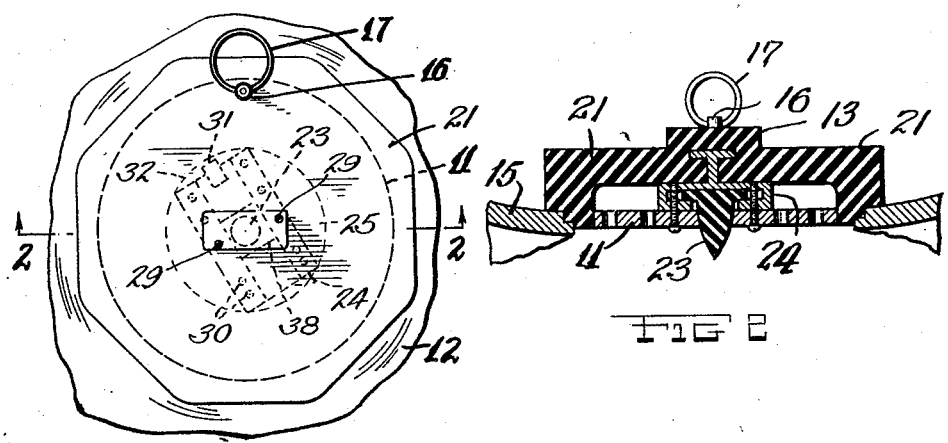
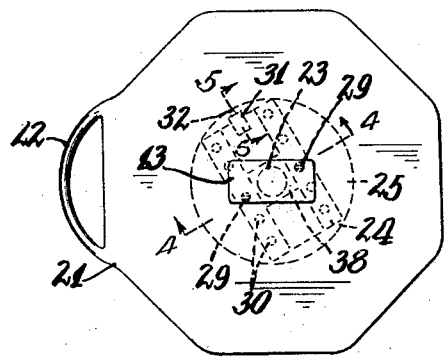
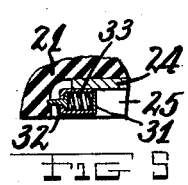
INVENTOR.
Frank Zorn
BY
ATTORNEY Patented Sept. 29, 1931

1,825,499

UNITED STATES PATENT OFFICE

FRANK ZORN, OF NEW YORK, N. Y.

NONSLIPPING STOPPER FOR SINKS AND THE LIKE

Application filed November 2, 1929. Serial No. 404,231.

This invention relates to new and useful improvements in a stopper for sinks and the like.

The invention has for an object the provision of a device of the class mentioned which is of simple durable construction, dependable in use and efficient in action, and which can be manufactured and sold at a reasonable cost.

The invention proposes a flat flexible soft rubber member of a size adapted to cover the water outlet strainer of a sink and provided with a gripping portion or means for convenient handling, a peg portion projecting from the bottom side of the flat member and adapted to engage an opening in said strainer for maintaining the position of the flat member upon the strainer.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a fragmentary plan view of a sink and a stopper constructed according to this invention applied thereon.

Fig. 2 is a fragmentary vertical sectional view taken on the line 2—2 of Fig. 1.

Fig. 3 is the same as Fig. 1, but provided with a different means for lifting.

Fig. 4 is an enlarged detailed fragmentary view of a portion of Fig. 2.

Fig. 5 is a fragmentary vertical sectional view taken on the line 5—5 of Fig. 3.

The stopper for sinks and the like consists of a flat flexible soft rubber member 21 of a size adapted to cover the water outlet strainer 11 of a sink 12 and provided with a gripping portion 13 or other means for convenient handling, and a peg portion 23 projecting from the bottom side of the flat member 21 and adapted to engage openings 15 in said strainer 11 for maintaining the position of the flat member upon the strainer.

In Figs. 1 and 2, a conventional strainer has been shown with a plurality of vertical apertures constituting the openings 15. The stopper may be used with any type of strainer, for example those constructed from woven strips, crossed bars, etc., though it is requisite that each of these strainers be provided with an opening for the passage of the peg portion 23. The flat member 21 may be of any shape and of a size to fully cover the strainer 11. As shown, it is of octagonal shape. The said gripping portion 13 consists of a central top projection from the member 21. A gripping means is also provided which consists of a top peg 16 projecting from the flat member 10 and provided with a ring 17 intended for connection with a chain. The leg portion 23 is adjustable and will be described in detail later.

In Figs. 3 to 5 another form of the device has been shown which differs from the preferred form in that a means for lifting the stopper has been used. A flat flexible soft rubber member 21 has been illustrated of a size adapted to cover a water outlet strainer of a sink and is provided with a lateral handle 22 for connection with a chain, and includes a peg portion 23 projecting from the bottom side of the flat member and adapted to engage an opening in said strainer for maintaining the position of the flat member upon the strainer, and a means is also provided for adjusting the position of the peg portion 23 adapting it to engage in an opening in said strainer with the center of the flat member coinciding with the center of the strainer irrespective of the location of the hole within the strainer.

This latter means consists of a guide bracket 24 rotatively mounted on the bottom side of the flat member 21 which is provided with a bottom circular depression 25 for receiving the bracket. The rotative mounting of the bracket is accomplished by a stem 26 projecting from the bracket and extending thru the flat member 21 and provided at its free end with a head portion 27. The peg 23 is integral with a slide portion 28 engaging in the guide bracket 24.

Means is provided for fastening the slide portion in any adjusted position along the length of the bracket.

This latter means consists of fastening screws 29 threadedly engaging in the bracket 24 and thru a portion of the slide portion 28. A plurality of threaded apertures 30 are arranged in the bracket so as to permit a selecting of the position in which the slide portion is fastened. Means are also provided for holding the guide bracket 24 in various rotative positions. This means consists of a casing 31 attached upon the guide bracket 24 and provided with a pin pointed plunger 32 urged outwards by a spring 33 housed within the casing.

The pin pointed plunger 32 may be manually depressed and the guide bracket 24 rotated to any desired angular position. The screws 29 may be temporarily removed from the guide bracket and the position of the slide adjusted so that the peg 23 may engage the opening in the strainer in a fashion so that the center of the flat member 21 coincides with the center of the strainer. The screws 29 are then reengaged and the pin pointed plunger released so that it extends and engages the material adjacent the recess 25.

In operation of the device, the flat flexible soft rubber member may be placed over a strainer of a sink, a basin, a bathtub or the like so that its peg engages in one of the openings of the strainer. The pressure of the water within the sink or basin forces the soft flat member tightly against the strainer and causes it to serve as a stopper. The peg prevents accidental side slipping of the flat member which would allow the running off of the water.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A stopper for sinks and the like, comprising a flat flexible soft rubber member of a size adapted to cover the water outlet strainer of a sink and provided with gripping portions for convenient handling, a peg portion projecting from the bottom side of the flat member and adapted to engage openings in said strainer for maintaining the position of the flat member upon the strainer, and means for adjusting the position of the peg portion adapting it to engage in the opening in said strainer so that the center of the flat member coincides with the center of the strainer irrespective of the location of the opening in the strainer.

2. A stopper for sinks and the like, comprising a flat flexible soft rubber member of a size adapted to cover the water outlet strainer of a sink and provided with gripping portions for convenient handling, a peg portion projecting from the bottom side of the flat member and adapted to engage openings in said strainer for maintaining the position of the flat member upon the strainer, and means for adjusting the position of the peg portion adapting it to engage in the opening in said strainer so that the center of the flat member coincides with the center of the strainer irrespective of the location of the opening in the strainer, said means includes a bracket rotatively mounted upon the flat member and adjustably supporting the peg portion, and means for holding the bracket in various adjusted positions.

In testimony whereof I have affixed my signature.

FRANK ZORN.